Figure 1:
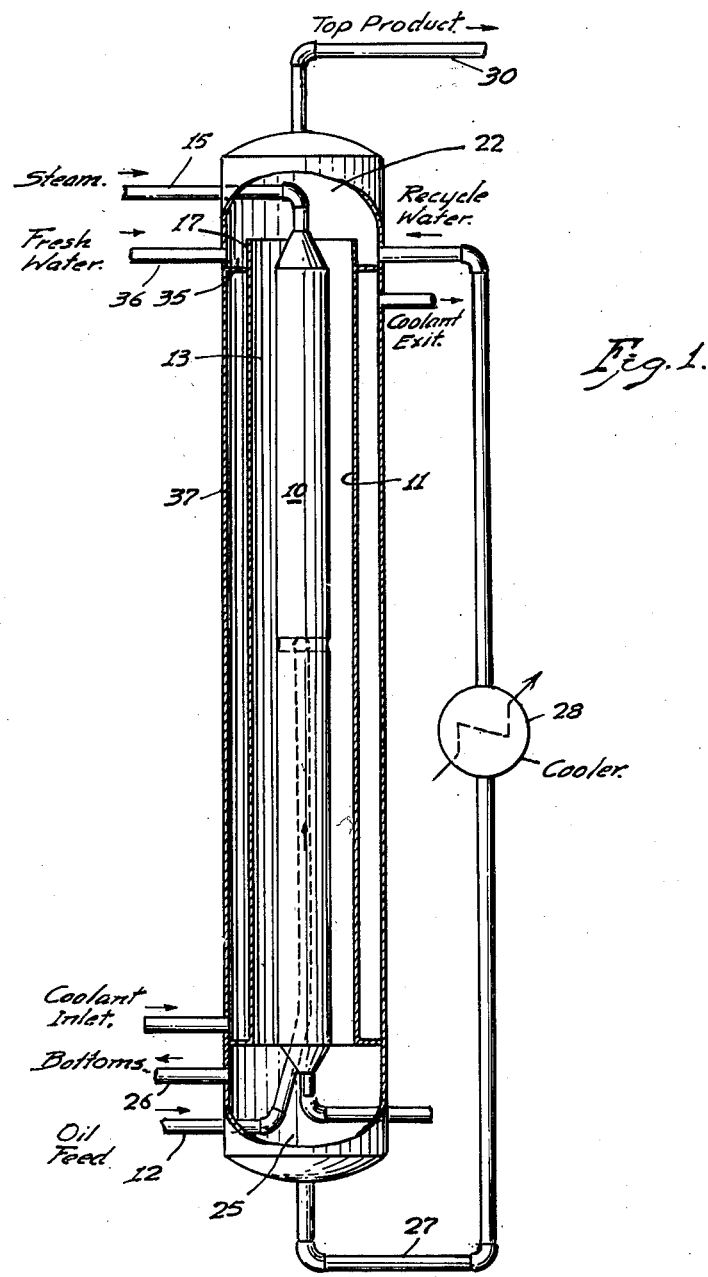

May 7, 1957 A. M. HENKE ET AL 2,791,332
SEPARATION OF LIQUIDS BY THERMAL DIFFUSION
Filed Nov. 2, 1954 2 Sheets-Sheet 2

INVENTORS.
Alfred M. Henke and
BY Harry C. Stauffer.
ATTORNEY:

2,791,332

SEPARATION OF LIQUIDS BY THERMAL DIFFUSION

Alfred M. Henke, Springdale, and Harry C. Stauffer, Cheswick, Pa., assignors to Gulf Research & Development Company, Pittsburgh, Pa., a corporation of Delaware Application November 2, 1954, Serial No. 466,296

2 Claims. (Cl. 210—72)

This invention relates to a method for separating liquid mixtures by thermal diffusion.

When a temperature gradient is established across a fluid mixture a difference in concentration develops between the hot and cold parts of the fluid. This phenomenon, which is known as "thermal diffusion," can be put to practical advantage in the separation of fluid mixtures. One apparatus that has been proposed for separating fluid mixtures by thermal diffusion comprises two concentric vertical tubes that form the walls for an annular chamber or slit. The inner wall is heated and the outer wall is cooled. The distance between the hot and cold walls is very small so that the temperature difference per unit of distance across the annular chamber or slit is very high. The fluid mixture to be separated is introduced into the annular space. The lighter component ordinarily tends to diffuse toward and concentrate along the hot wall while the heavier component tends to diffuse toward and concentrate along the cold wall. This results in convection currents, the lighter component along the hot wall rising and the heavier component along the cold wall flowing downwardly.

The convection currents in the described apparatus increase the rate of separation over the rate of a single stage separation by thermal diffusion. However, the rate in such a unit is still so slow for liquid mixtures that more rapid separation methods such as distillation, solvent extraction, etc. are usually preferred. Accordingly, a need has arisen for a method of separating liquids which can offer the advantages of thermal diffusion as to the types of separations it can make but which can make the separations at a more rapid rate than conventional thermal diffusion.

The present invention provides an improvement in thermal diffusion separation by increasing the rate of flow of the convection currents in the liquid being separated so that, as compared with conventional thermal diffusion, a more efficient separation is obtained at a given feed rate or a similar degree of separation at a more rapid feed rate. The separations that we can make by the method of our invention include separations of a mixture of liquids into substantially pure components, and also separations or fractionations of binary or multicomponent mixtures into products enriched in a desired component or purified of an undesired component of the feed.

In the method of our invention, a liquid mixture is introduced into a thermal diffusion slit bounded on one side by a solid wall and on the other side by a parallel moving wall formed by a flowing film of liquid. The liquid film is maintained throughout its extent at a temperature substantially different from that of the solid wall. An upflowing stream enriched in one component of the feed mixture is recovered as one product and a downflowing stream enriched in another component is recovered as another product. The flowing film of liquid that forms the moving liquid wall of the thermal diffusion slit is immiscible with at least the part of the feed that flows in the direction opposite to the flow of the liquid wall. In the preferred embodiment of our method, the liquid used for the moving wall is more dense than the feed mixture and forms a downflowing liquid wall. This liquid is maintained at a temperature below that of the stationary solid wall and therefore forms a downflowing liquid cold wall. This cold wall liquid is immiscible with at least the part of the feed desired as top product.

Figure 2:
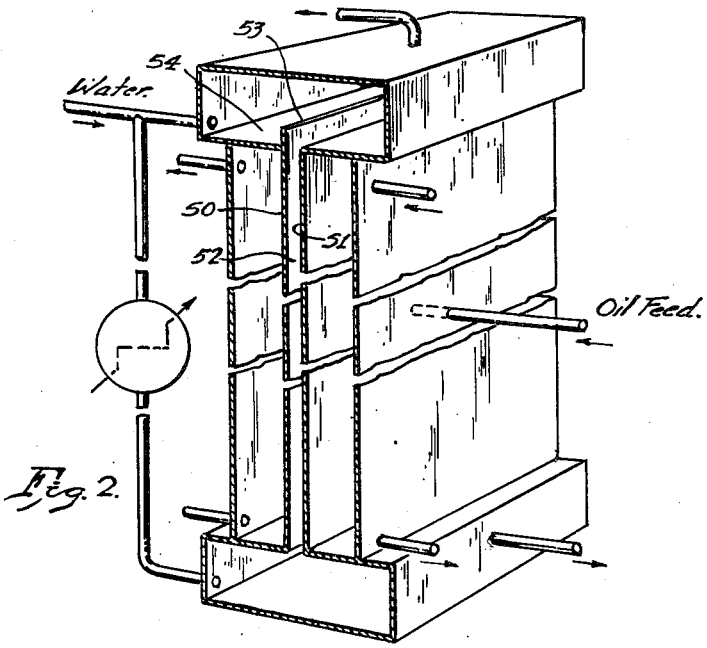
Figure 3:
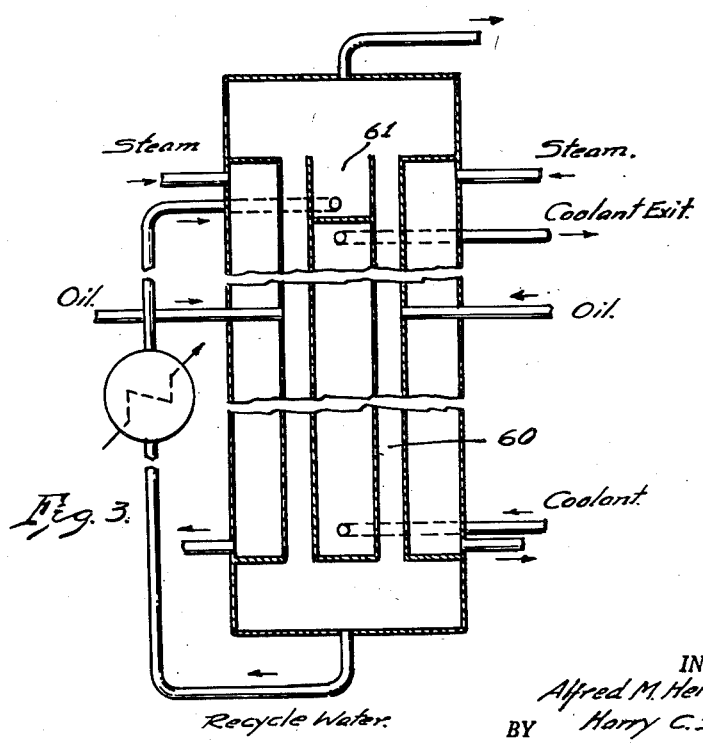

Particular embodiments of the invention will be described in detail by referring to the drawings. Figure 1 is a diagrammatic view in vertical section of one form of apparatus in which the method of our invention can be carried out. Figure 2 is a diagrammatic perspective view of an apparatus in which the thermal diffusion slit is formed between parallel plates. Figure 3 is a sectional view of an apparatus formed from a bundle of such plates.

The apparatus of Figure 1 comprises a tube 10 disposed concentrically within an outer tube 11. Tube 10 forms the hot wall of the apparatus. It is heated in any convenient way, for example, by flowing through it a hot fluid such as steam introduced via line 15. The inner surface of tube 11 provides a surface on which is formed the actual cold wall of the apparatus, namely, a downflowing film of cold liquid. Tube 11 is surrounded by a cooling jacket 37 through which a coolant fluid is circulated to maintain a substantially constant temperature throughout the area of the cold wall.

Tube 11 is provided at its upper end with means for evenly distributing liquid along its inner surface. Figure 1 shows a suitable means in the form of an overflow weir 17 which is an extension of cylinder 11. Weir 17 forms the inner wall of a trough 35 for collecting cold wall liquid.

The annular chamber or slit 13 at its upper end opens into a chamber or accumulator 22 for top product that encloses the upper end of the separation column. The lower end of the annular slit opens into the accumulator 25 for bottoms product that encloses the lower end of the column. A line 12, for introducing the feed mixture, enters the apparatus through the hot wall 10 so that feed can be introduced without interrupting the flow of the cold wall liquid film. Preferably, as shown in the drawing, the feed is passed through the hot wall at several points so that it will be uniformly distributed.

The bottoms product accumulator 25 is provided with a bottoms product outlet line 26 and a line 27 for withdrawing cold wall liquid for recycle to the top of the apparatus. Line 27 passes through a cooler 28 and then to the top of the apparatus to deliver the recooled liquid into the cold wall liquid trough 35. A line 36 is provided to deliver fresh cold wall liquid at the start of the process or to make up any liquid lost during operation. The top product accumulator 22 has a line 30 for withdrawing top product.

The method of the invention, as carried out in the apparatus of Figure 1, will be described as it applies to the fractionation of a particular liquid mixture. An example of a liquid mixture that can be fractionated with advantage by the method of the invention is a petroleum lubricating oil having a viscosity index of 110, a gravity of 31.6° API, a viscosity at 100° F. of 159 SUV and a viscosity at 210° F. of 44.4 SUV. This oil can be separated by our method into fractions of high and low viscosity index. The oil is charged via line 12 to the slit 13 at a temperature of about 70° F. The entire space within the apparatus, including slit 13 and product accumulators 22 and 25, is filled with liquid. After the apparatus is filled with liquid, a constant feed rate or space velocity of oil is maintained.

The slit width, or distance between the hot wall and the surface of the liquid film that forms the cold wall, is preferably about 0.03 inch for this separation. The preferred cold wall liquid in this separation is water. Water has the advantages of being immiscible with the lubricating oil and its fractions and of being more dense than the oil so that it will flow downwardly and form the continuous cold wall liquid film. The cold wall water film is maintained at a temperature of about 160° F. by charging the water to the apparatus at about this temperature and circulating cooling water through cooling jacket 37 at about the same temperature or a few degrees lower. A hot wall temperature of 345° F. is maintained by condensing steam within tube 10. Saturated steam at about 125 pounds per square inch pressure is charged to tube 10 by line 15.

As the feed mixture is subjected to the temperature difference of 185° F. across the narrow slit 13, its components begin to separate. The paraffinic components tend to move toward the hot wall 10 while the naphthenic and aromatic components tend to move toward the downflowing cold wall of water along the inner surface of tube 11. The components concentrating along the hot wall are of generally lower density than those along the cold wall. Convection currents develop as the lighter material rises along the hot wall while the more dense material along the cold wall flows downwardly. Since the cold wall is a downwardly flowing film of liquid, the material concentrating along the cold wall is subjected to the drag of the downflowing cold wall liquid. This increases the rate of the convection currents and increases the rate of separation. The downflow rate of materials along the cold wall can be further increased by solvent extraction if the components concentrating along the cold wall are soluble in the cold wall liquid.

In the apparatus of Figure 1 the water and the fraction rich in aromatics and naphthenes that concentrates along the cold wall flow downwardly and collect in the bottoms product accumulator 25. The water and oil separate in accumulator 25 because of their immiscibility and differences in density. The water is withdrawn via line 27 for recycle to the apparatus and the oil is taken off via line 26 for recovery as bottoms product. The fraction that concentrates along the hot wall of the apparatus rises and collects in the top product accumulator 22 above the layer of water in the trough 35. The top product enriched in paraffins is taken off via line 30. This fraction is colorless and has a substantially higher viscosity index than the feed or the bottoms product. In an operation in which the top and bottoms product are taken off at a volume ratio of 1:1 and the described operating conditions are used, the lubricating oil described above with a viscosity index of about 110 can be separated into a top product with a viscosity index of about 125 and a bottoms product with a viscosity index of about 95. The differences in the two products can be made even greater by varying the operating conditions of the process. The process variables will be discussed in more detail further on.

The above description has dealt only with the Figure 1 type of apparatus in which the inner tubular wall is the hot wall and the outer wall is the cold wall. However, this arrangement can be reversed to make the outer wall the hot wall and the inner wall the surface for the liquid cold wall. For such an arrangement, liquid distributing means such as a liquid trough and overflow weir are provided at the top of the inner wall. Coolant is flowed through the inner tube to maintain the cold wall temperature and a heating fluid is circulated through the outer wall jacket. Furthermore, the apparatus formed by concentric tubes, as shown in Figure 1, is not the only suitable apparatus. The narrow thermal diffusion slit can be formed between parallel vertical plates, as shown in Figure 2. In this apparatus the vertical plates 50 and 51 form the cold and hot walls, respectively, and enclose the thermal diffusion slit 52. At the top of the wall 50 is a long, straight overflow weir 53 and a straight trough 54 for cold wall liquid. The cooling jacket for the cold wall, the product accumulators and drawoff lines are arranged in a manner similar to the arrangement for the concentric tube apparatus of Figure 1.

If desired, the apparatus can be formed from a bundle of vertical plates, as shown in Figure 3 of the drawing. In such an arrangement a single cooling jacket 60 and cold wall liquid trough 61 serve two cold walls arranged back to back. Likewise, a single heating jacket can be used for two hot walls arranged back to back. The feed mixture is charged to the mid-point of each thermal diffusion slit and the top and bottoms products from each slit are collected in common top and bottoms product accumulators for the entire bundle.

The drawings show apparatus with vertical walls. It should be understood, however, that the method of the invention can also be carried out in apparatus with inclined walls.

The parallel plate apparatus, as illustrated in Figure 3, can be changed to an inclined wall apparatus with little change in structure. The change can be made by tilting the walls toward the cold side and making any structural changes necessary to keep desired elements horizontal or vertical. For example, it would be desirable to keep the cold wall liquid trough horizontal. The conversion of the concentric tube apparatus having an annular slit, such as shown in Figure 1, to an inclined wall apparatus requires more change in structure. One suitable structure is an apparatus in which the thermal diffusion slit is in a truncated conical form with the base of the cone at the top.

The above description and the discussion that follows are directed chiefly to the modification of our invention in which the liquid wall of the thermal diffusion slit flows downwardly and is maintained at a temperature below that of the solid wall or, in other words, the modification in which we use a downflowing liquid cold wall. This is the preferred modification of our process. It is particularly preferred for separations of petroleum products because it makes possible the use of water as the downflowing cold wall liquid that is immiscible with the top product. However, it should be understood that our invention also includes using an upflowing liquid wall on the hot side of the thermal diffusion slit for separations in which such procedure would be desirable as in the separation of high density mixtures for which it would be difficult to provide a liquid wall that would flow downwardly. For example, in separating an aqueous mixture we can use a hydrocarbon oil as an upflowing hot wall liquid.

We have described specific operating conditions for fractionating a lubricating oil in our process. These conditions are suitable for the particular mixture described and for the results obtained. However, the conditions can be varied considerably depending on the type of mixtures being separated and the results desired, that is, depending on whether it is desired to separate the mixture rapidly into fractions which are not sharply defined or whether a careful separation of components is desired without regard to time.

The temperatures for the hot and cold walls are selected to provide a large temperature gradient across the thermal diffusion slit because, in general, the rate of separation increases as the difference in temperature per unit of distance across the slit increases. However, wall temperatures must be chosen that will provide a reasonably large gradient across the slit without either wall temperature being so low as to make the liquid too viscous or so high as to cause the liquid to decompose or vaporize. In thermal diffusion "hot" and "cold" are relative terms. Both the hot and cold walls may be above or below normal atmospheric temperature. In fractionating the lubricating oil described above, a hot wall temperature of about 345° F. and a cold wall temperature of about 160° F. give a suitable balance of the different factors.

The slit width is an important variable in thermal diffusion. The slit must be narrow so that a high temperature gradient per unit of distance will be obtained, but if it is too narrow the capacity of the unit will be too low. A slit width of from about 0.01 to 0.1 inch is used in the method of our invention for separating liquid mixtures.

In describing our method we may, for convenience, refer to the rigid wall on the cold side of the apparatus, such as wall 11 in Figure 1, as being the cold wall of the thermal diffusion slit. However, strictly speaking, the actual cold wall in our method is the downwardly flowing film of liquid which is formed on the rigid wall. The cold wall surface is at the interface formed between the cold wall liquid and the liquid mixture being separated. The slit width is the distance from this interface to the surface of the hot wall.

A number of different liquids can be used as the cold wall liquid in our process. The liquid must be one that will flow downwardly in the mixture being separated and form a continuous film along the rigid wall on the cold side of the thermal diffusion slit. Therefore it must be liquid at the temperatures used in the separation and it must be substantially more dense than the mixture being separated. The liquid should not be chemically reactive with the mixture being separated. It should be immiscible with the components desired in the top product. If it is a solvent for these components, they will be at least partially removed from the mixture by solvent extraction and will not pass to the top of the apparatus with the rest of the top product.

The cold wall liquid can be either immiscible or miscible with the components desired as bottoms product. Both choices offer advantages and disadvantages. If the cold wall liquid is a solvent for components of the bottoms product, there will be some solvent extraction of these components from the feed mixture. This will tend to increase the rate of separation. On the other hand, it will be necessary to separate the cold wall liquid from the product. A cold wall liquid that is immiscible with all constituents of the feed has the advantage that it can be separated from the bottoms product merely by decantation in a settling chamber at the bottom of the thermal diffusion apparatus.

Water is the preferred cold wall liquid for use in thermal diffusion separation of hydrocarbons. It is more dense than the hydrocarbons that can be separated with advantage by thermal diffusion and is substantially immiscible with them. In separating water-soluble mixtures, a dense liquid such as carbon tetrachloride can be used as the cold wall liquid.

The space velocity for the mixture to be separated depends upon the degree of separation desired. By space velocity we mean the volume of feed charged per volume of slit capacity per hour. In separating liquid fractions of petroleum in the method of our invention we use space velocities varying from about 0.05 to 1.5 liquid volumes per volume of slit capacity per hour, depending upon the results desired. Lower space velocity can be used if very careful fractionation is desired and faster rates when the degree of fractionation does not have to be so high. For any particular degree of separation of a liquid mixture, the space velocity in the method of our invention can be from about 10 to 100 percent higher than in a conventional thermal diffusion separation in an apparatus having stationary walls.

We have described our method in the separation of a particular mixture, a petroleum lubricating oil. The method can make valuable separations of many other liquid mixtures of petroleum origin. It can also be used outside of the field of petroleum refining to separate or refine a wide variety of liquid mixtures, for example, the products of various synthesis reactions, mixtures of isomers of organic compounds, including stereo-isomers, isotopic mixtures, etc.

Obviously many modifications and variations of the invention as hereinbefore set forth may be made without departing from the spirit and scope thereof and therefore only such limitations should be imposed as are indicated in the appended claims.

We claim:

1. A method for separating a liquid mixture by thermal diffusion which comprises introducing the liquid mixture into a thermal diffusion slit entirely filled with liquid, said slit being bounded on one side by a solid impermeable wall and on the other side by a parallel downflowing film of cold wall liquid horizontally spaced apart from said solid wall, the distance across the thermal diffusion slit from the surface of the cold wall liquid to the parallel solid wall being from about 0.01 to about 0.1 inch, said cold wall liquid being susbtantially immiscible with at least the part of the feed mixture to be recovered as top product of the process, maintaining the film of cold wall liquid throughout its area at a temperature substantially below the temperature of the solid wall, recovering from the upper end of the slit a fraction enriched in a component which concentrates along the solid impermeable wall, and recovering from the lower end of the slit the cold wall liquid and a fraction enriched in a component which concentrates along the low temperature side of the thermal diffusion slit.

2. A method for separating a liquid mixture by thermal diffusion which comprises introducing the liquid mixture into a thermal diffusion slit entirely filled with liquid, said slit being bounded on one side by a solid impermeable wall and on the other side by a parallel downflowing film of cold wall liquid horizontally spaced apart from said solid wall, the distance across the thermal diffusion slit from the surface of the cold wall liquid to the parallel solid wall being from about 0.01 to about 0.1 inch, said cold wall liquid being substantially immiscible with at least the part of the feed mixture to be recovered as top product of the process and said liquid being a solvent for a component of the feed that is desired as bottoms product, maintaining the film of cold wall liquid throughout its area at a temperature substantially below the temperature of the solid wall, recovering from the upper end of the slit a fraction enriched in a component which concentrates along the solid impermeable wall, recovering from the lower end of the slit the cold wall liquid having in solution a component which concentrates along the low temperature side of the thermal diffusion slit, separating the cold wall liquid from the component of the feed mixture dissolved therein and recycling said cold wall liquid to the upper end of the thermal diffusion slit.

References Cited in the file of this patent

UNITED STATES PATENTS

| | | |
|---|---|---|
| 1,716,974 | Payne | June 11, 1929 |
| 2,031,711 | Jaenicke et al. | Feb. 25, 1936 |
| 2,073,638 | Houdry | Mar. 16, 1937 |
| 2,108,087 | Thayer | Feb. 15, 1938 |
| 2,154,434 | Bond | Apr. 18, 1939 |
| 2,170,180 | Youker | Aug. 22, 1939 |